March 5, 1940.  F. V. JOHNSON ET AL  2,192,229
ASSEMBLY APPARATUS
Filed Jan. 7, 1937  8 Sheets-Sheet 1

INVENTORS
F. V. JOHNSON
D. C. ROBSON
G. A. SEELEY
BY
E. R. Nowlan
ATTORNEY

March 5, 1940. F. V. JOHNSON ET AL 2,192,229
ASSEMBLY APPARATUS
Filed Jan. 7, 1937 8 Sheets-Sheet 4

INVENTORS
F. V. JOHNSON
D. C. ROBSON
G. A. SEELEY
BY
E. R. Nowlan
ATTORNEY

March 5, 1940.    F. V. JOHNSON ET AL    2,192,229
ASSEMBLY APPARATUS
Filed Jan. 7, 1937    8 Sheets-Sheet 5

INVENTORS
F. V. JOHNSON
D. C. ROBSON
G. A. SEELEY
BY
E. R. Nowlan
ATTORNEY

March 5, 1940.   F. V. JOHNSON ET AL   2,192,229
ASSEMBLY APPARATUS
Filed Jan. 7, 1937   8 Sheets-Sheet 6

INVENTORS
F. V. JOHNSON
D. C. ROBSON
G. A. SEELEY
BY
E. R. Nowlan
ATTORNEY

March 5, 1940. F. V. JOHNSON ET AL 2,192,229
ASSEMBLY APPARATUS
Filed Jan. 7, 1937 8 Sheets-Sheet 7

INVENTORS
F.V. JOHNSON
D.C. ROBSON
G.A. SEELEY
BY E.R. Nowlan
ATTORNEY

March 5, 1940.  F. V. JOHNSON ET AL  2,192,229
ASSEMBLY APPARATUS
Filed Jan. 7, 1937  8 Sheets-Sheet 8

INVENTORS
F. V. JOHNSON
D. C. ROBSON
G. A. SEELEY
BY E. R. Nowlan
ATTORNEY

Patented Mar. 5, 1940

2,192,229

UNITED STATES PATENT OFFICE 2,192,229

ASSEMBLY APPARATUS

Fred V. Johnson, Duer C. Robson, and George A. Seeley, Baltimore, Md., assignors to Western Electric Company, Incorporated, New York, N. Y., a corporation of New York Application January 7, 1937, Serial No. 119,394

22 Claims. (Cl. 173—244)

This invention relates to assembling apparatus and more particularly to apparatus for assembling slotted disks at spaced intervals on a strand.

In some instances, coaxial conductor electric cables are constructed to comprise a pair of coaxially positioned, generally cylindrical conductors, the outer and larger conductor being hollow and enclosing the inner and smaller one, the two conductors being spaced apart from each other by relatively thin disks of insulating material embracing the inner conductor at relatively wide intervals, each disk having a central perforation to receive the inner conductor and a slot leading from the perforation to the periphery of the disk whereby the disk may be assembled on the central conductor, the outer conductor being then assembled on or formed over the peripheries of the disks.

An object of the present invention is to provide a reliable, accurate and relatively simple apparatus for automatically assembling such disks on a strand at predetermined intervals and preferably in such fashion that the slots of successive disks will have different orientations radially with respect to the strand.

One embodiment of the invention contemplates an apparatus having means to advance a strand from a supply thereof in step by step fashion past an assembling point, a magazine or a plurality of magazines for holding and feeding disks to the strand at the assembling point, means to press a disk from each magazine in turn into position on the wire, and means to receive the completed product.

Other objects and features of the invention will appear from the following detailed description of one embodiment thereof taken in connection with the accompanying drawings in which the same reference numerals are applied to identical parts in the several figures and in which.

As herein disclosed, an apparatus embodying the invention is mounted on and grouped around a frame or table 30 having legs 31 and a top 32. A strand 25 on which disks 27 are to be assembled is drawn upwardly from a supply generally indicated at 26 located under the table. Here the supply means is shown as an ordinary reel 28 standing on the floor on one of its heads, the strand being simply pulled off over a conoidal guide 29 resting on the other head. Any well known type of supply reel support such as one in which the reel is rotatably supported might also be used. Each disk 27 has a central perforation 24 and a radial slot 23 leading from the perforation to the periphery of the disk. The perforation 24 is dimensioned to fit and grip the conductor snugly and the slot 23 is narrower than the conductor over at least part of the length of the slot. The particular form of disk herein disclosed is no part of the present invention being disclosed and claimed in copending application Serial No. 79,478, filed May 13, 1936 by George A. Seeley. This application has matured to Patent Number 2,128,434 dated August 30, 1938.

Figure 1:
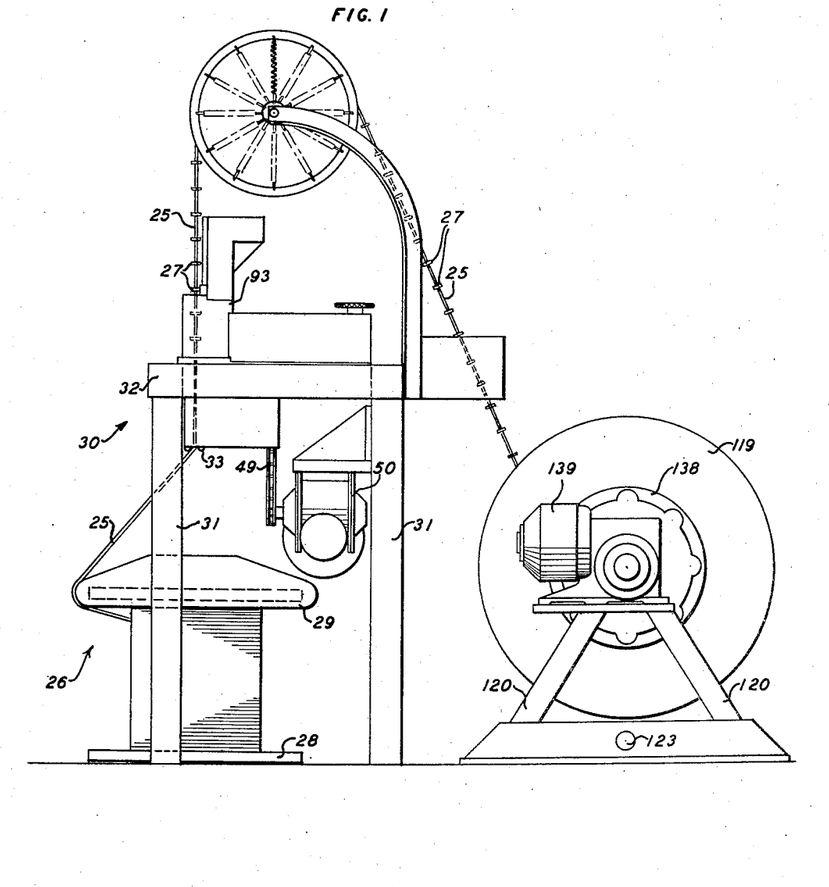
Fig. 1 is a diagrammatic view in side elevation of an apparatus constructed in accordance with the invention.
Figure 2:
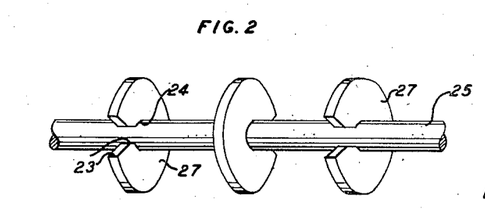
Fig. 2 is an enlarged view in perspective of a portion of the product thereof.
Figure 3:
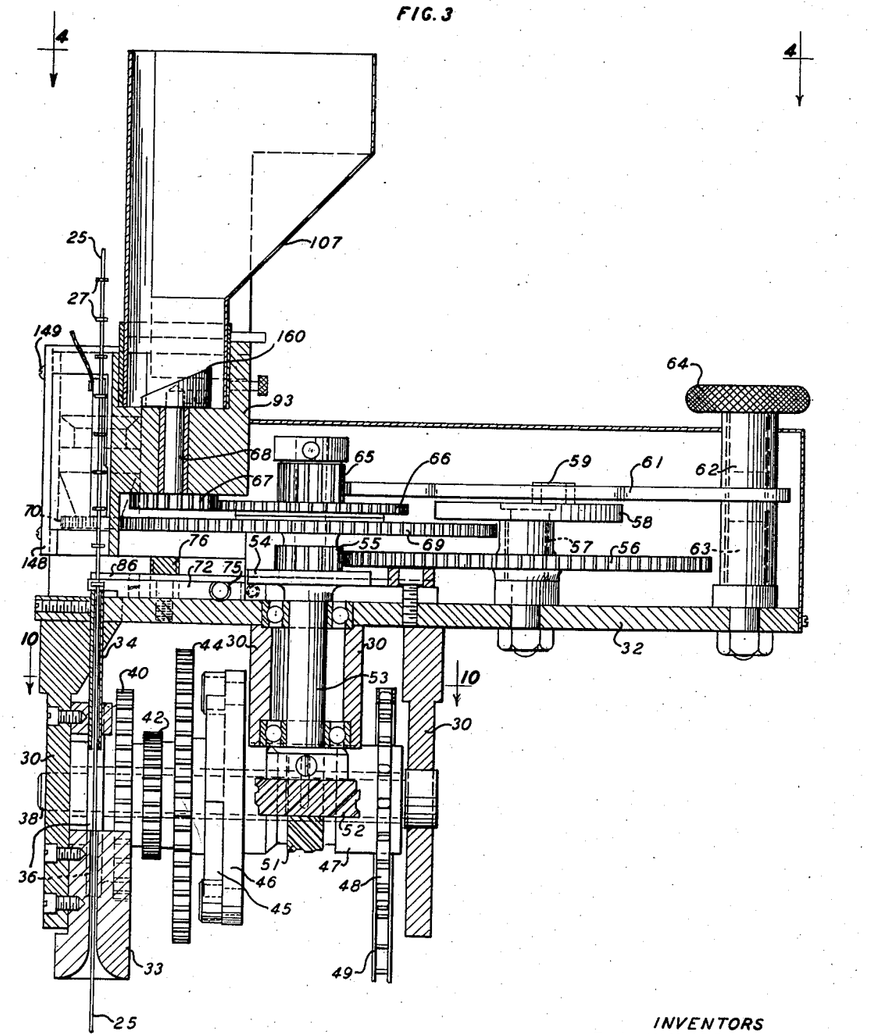
Fig. 3 is an enlarged view in central vertical section of the disk applying unit of the apparatus.
Figure 10:
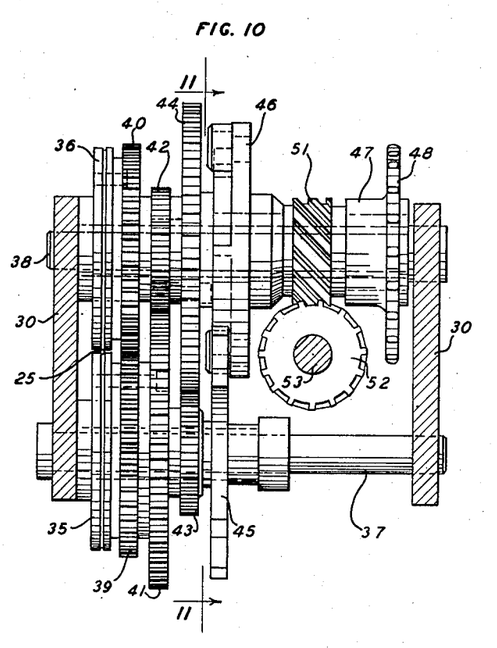
Fig. 10 is an enlarged detached view of the transmission unit taken on the line 10—10 of Fig. 3.
Figure 11:
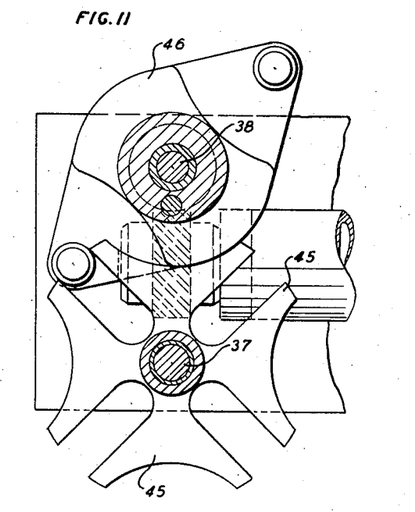
Fig. 11 is a sectional view on the line 11—11 of Fig. 10.

The strand 25 passes from the supply 26 up through a vertically bored guide member 33 rigidly supported on the frame 30 and thence through a second guide member 34 (Fig. 3) supported in and passing through the frame top 32. Between the guides 33 and 34, the strand passes between a pair of identically similar grooved strand driving rolls or sheaves 35 and 36 (Figs. 3 and 10).

The sheaves 35 and 36 are mounted to rotate freely respectively on fixed shafts 37 and 38 supported in the frame, and are provided further with integral or rigidly secured identically similar gears 39 and 40 which mesh together to keep the sheaves in step. A large gear 41 rigid with the gear 39 is driven by a smaller gear 42 rotatable on the shaft 38 and rigid with a large gear 44 driven in turn by a smaller gear 43 rotatable on the shaft 37. The gear 43 is rigid with and driven by the four-slotted disk 45 (rotatable also on the shaft 37) of a Geneva motion, the two-pin driving member 46 of which is rotatable on the shaft 38. Rigid with the member 46 is a sleeve 47 having on its other end a rigidly secured sprocket 48 driven by a chain 49 from a motor 50 mounted on a bracket secured to the frame.

The sleeve 47 is formed between the member 46 and the sprocket 48 with a spiral gear 51 which meshes with a corresponding spiral gear 52 secured on a vertical shaft 53 journalled in the table 32. Just above the table is a cam 54 secured to the shaft 53 and above that is a small gear 55 also secured to the shaft 53. The gear 55 meshes with and drives a large gear 56 mounted to be rotatable on a stub shaft 57 supported on the table. Integral with the gear 56 is a disk 58 carrying an eccentric drive pin 59 which engages in a slot 60 (Figs. 3 and 4) formed radially in a toothed sector 61 pivoted by means of an integral sleeve 62 on a stub shaft 63 also carried by the table. The sleeve 62 is further formed at its upper end with a circular handle 64.

The sector 61 meshes with a gear 65 rotatably mounted on the upper end of the shaft 53 and rigid with a larger gear 66 which meshes with a smaller gear 67 rigid on the lower end of a short vertical shaft 68 to be referred to again later. Returning now to the gear 55, this is rigid with a large gear 69 which meshes with a pair of small gears 70, 70 (one only shown in Figs. 3 and 5) also to be recurred to later.

The cam 54 lies between and actuates a pair of levers 71 and 72 (Figs. 3, 4, 15 and 17), pivoted to the table at 73 and 74 respectively, drawn together by a tension coil spring 75 and constrained to move in the plane of the table top by a bar 76. The outer ends of the levers 71 and 72 are symmetrically identical and a description of one will serve for both. Thus, the outer end of the lever 71 is formed on its side toward 72 with a vertical slot 77 of a width triflingly greater than the diameter of the wire 25. The slot opens at the inner face of the lever and the other end of the slot is a semi-cylinder approximately of a size to fit the wire. In the upper face of the lever end this slot 77 is widened to form a parallel broader slot or recess 78 adapted to receive one of the disks 27 and support it while it is being pushed into position on the wire as hereinafter described. A keeper 79 (Figs. 16 and 17) is pivoted in a slotted lug 80 formed on the under side of the lever 71 and has a guide nose 81 formed thereon to extend normally up through the slot 77 and into the slot 78 to enter the slot 23 of a disk 27 resting in the slot 78 and thus keep the disk slot 23 suitably oriented. The keeper 79 also has a trigger 82 formed thereon which travels freely in an appropriate slot or recess 83 provided therefor in the table 32, and coacts with a pin 84 mounted in the table across the recess 83 to be held thereby in the position shown in full lines in Fig. 17 or in the position shown in dotted lines as the lever 71 is moved by the cam 54.

Figure 15:
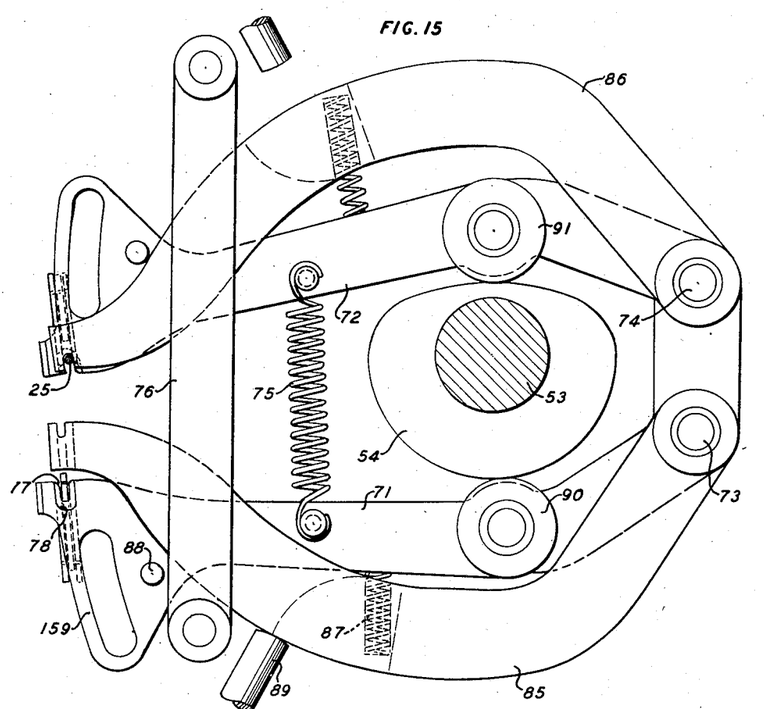
Fig. 15 is a further enlarged detached plan view of the disk applicator members.

Immediately above each of the levers 71 and 72 and resting thereon is a coacting disk retaining lever 85 and 86 respectively, pivoted on the same pins 73 and 74 as the levers 71 and 72 and each notched to correspond to the slot 77. As these levers 85 and 86 are symmetrically identical only the lever 85 will be described in detail. A compression spring 87 housed in a suitable recess in the lever 85 and abutting against the lever 71 tends to keep the lever 85 pressed counterclockwise as seen in Fig. 15 against a stop pin 88 mounted in the lever 71. However, when the lever 71 is moved counterclockwise, the lever 85 moves with it only until the lever 85 abuts against a stop member 89 mounted in the table 32 when the lever 85 stops while the lever 71 moves on.

Preferably the levers 71 and 72 are provided with cam rollers 90 and 91 respectively to coact with the cam 54.

When the lever 71 is at the clockwise end of its motion, it stands with its slot 77 embracing the strand 25. At the counterclockwise limit of its motion, its slot or recess 78 is positioned directly under the disk delivery means of a disk magazine such as is shown particularly in Fig. 5 or Fig. 16.

Figure 5:
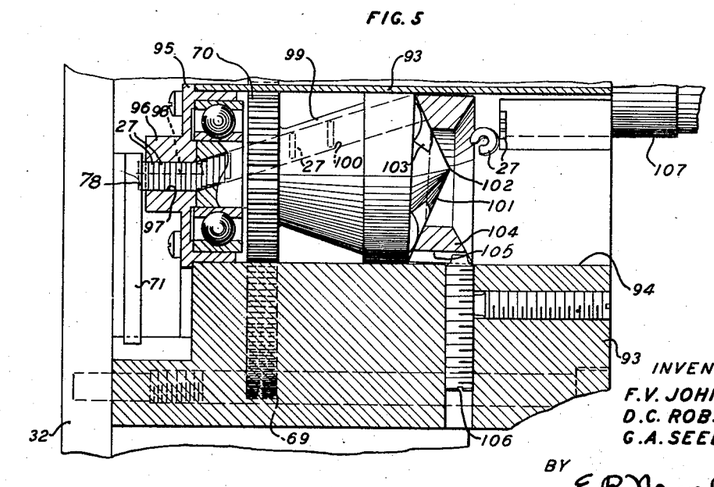
Fig. 5 is a further enlarged view in section on the line 5—5 of Fig. 4.

The magazine disclosed in Fig. 5 comprises a housing 93 mounted on the table 32 and having a vertical cylindrical chamber 94 therein (Fig. 5 is laid on its side to save room) closed at the bottom by a detachable floor member 95 formed with a downwardly projecting nozzle 96 having a central vertical bore 97 just large enough to pass a stacked column of discs 27. A radially inwardly projecting fin 98 mounted in the wall of the bore 97 serves to orient and align the slots 23 of these disks 27. Immediately above the member 95 and coaxially in the chamber 94 is positioned a rotatable disk aligning member 99 rotatably supported on the floor 95 in anti-friction bearings as shown. A cylindrical bore or disk passageway 100 leads through the member 99 from a point near the periphery of its generally conoidal top surface 101 to the center of its flat bottom surface where the bore 100 communicates directly and matchingly with the upper end of the bore 97. One of the gears 70 before referred to is formed on the body of the member 99.

The upper surface 101 of the member 99 is basically a cone tilted a little out of coaxial relation with the chamber 94 so that the apex 102 of the cone is off center. The surface 101 is further formed with a plurality of radial projections 103, 103.

Above the surface 101 and resting loosely on the projections 103, 103 is an annulus 104 of slightly less outer diameter than the diameter of the chamber 94, so that the annulus may tilt a little in the chamber. The bottom surface of the annulus is conic of the same angle as the cone 101, and it rests on the projections 103, 103 being maintained by them at a distance from the surface 101 triflingly greater than the thickness of a disk 27. The top surface of the annulus 104 is also conical to serve as a kind of hopper. A vertical slot or notch 105 in the outer face of the annulus serves to prevent the annulus from rotating by receiving the reduced tip end of a screw 106 mounted in the housing 93.

In this form of the apparatus, the levers 85 and 86 with their appurtenances and the keepers 79 may be omitted as shown in Fig. 5, the recesses or slots 78 being alone depended on to hold the disks 27 in proper orientation for application to the strand 25. However, a comparison of Figs.

Figure 16:
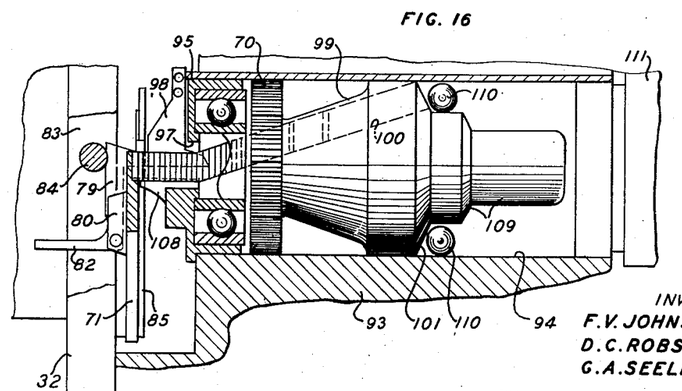
Fig. 16 is a view similar to Fig. 5 of a modified form.
Figure 17:
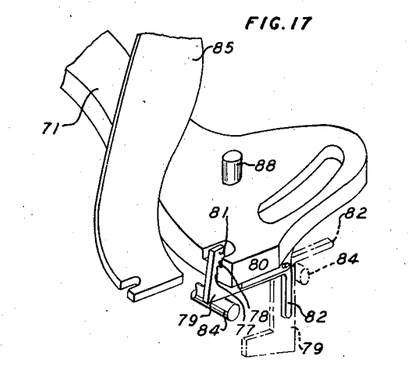
Fig. 17 is an enlarged broken view in perspective of one of the disk applying levers.

5 and 16 will show that there is nothing about the magazine of Fig. 5 to prevent coaction therewith of levers 71 and 85, or to prevent addition of the keeper 79 and its appurtenances if desired.

Figure 4:
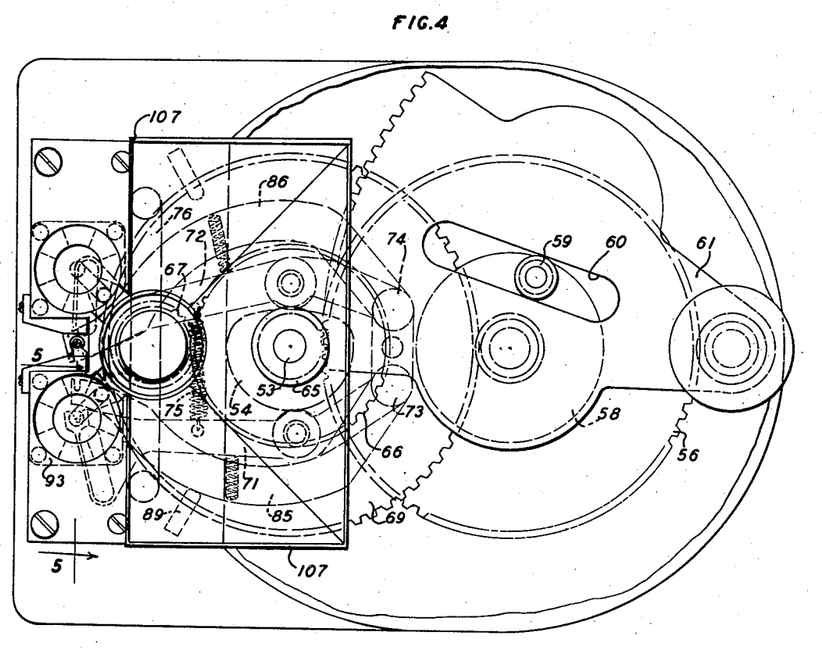
Fig. 4 is a corresponding view in plan.

The magazine of Fig. 5 is one of two duplicate devices, the other of which as shown in Fig. 4 serves to feed disks to the lever 72. A single hopper 107 serves to supply disks to both magazines, and the disks feed down from the hopper 107 and through the twin magazines, by gravity, to the levers 71 and 72.

Figure 6:
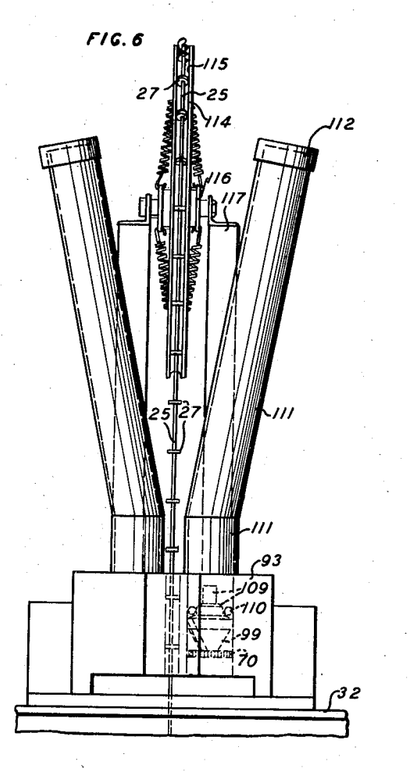
Fig. 6 is an enlarged view in front elevation of an alternative form of the magazine unit.
Figure 7:
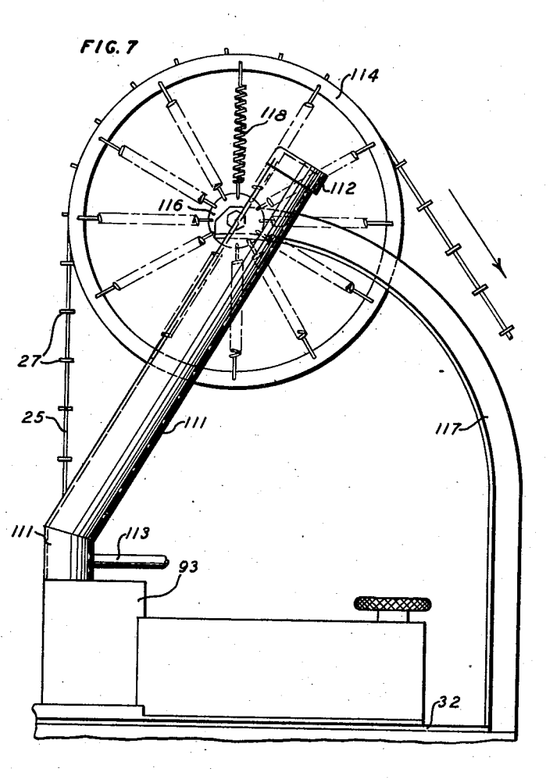
Fig. 7 is an enlarged view thereof in side elevation.

It is thought, however, that, although the apparatus of Fig. 5 is generally satisfactorily operative, a somewhat greater infrequency of failure to seat disks on the strand in unbroken sequence may be obtained by means of the magazine and disk feed shown as an alternative in Figs. 6, 7 and 16.

In this form, the housing 93 has the same cylindrical chamber 94, bottom closure 95, and rotary disk aligning member 99. Here, however, there is no guide nozzle 96 and the bore or aperture 97 in the bottom closure is considerably larger in diameter than the disks 27 which pass freely therethrough from the slanting bore 100. The guide fin 98 has a tail by means of which it is attached to a lug on the bottom member 95. On the other side of the column of disks being fed down along the fin 98 is a pair of spaced fins 108 (one only shown in Fig. 16, the other lies parallel thereto in front of the section plane of the figure), secured to the bottom 95, along whose parallel vertical edges the disks are guided.

The upper end of the member 99 in this form has a coaxially oriented conical periphery, from the inner edge of which rises a stepped cylinder 109, leaving a stepped annular space between the chamber wall and the cylinder. In this space is located a number of loose, metal balls 110 to be tossed about by the rotation of the parts and so to keep the disks stirred up.

The upper end of the chamber leads directly from a sealed in tube 111, serving as a hopper to supply disks to the chamber, and sealable by a removable cap 112. A pipe connection 113 enters the tube 111 at any convenient point and serves to carry compressed air into the magazine from any suitable supply not shown.

The strand 25 with disks 27 spaced thereon passes up from between the levers 71 and 72 and over a sheave whose rim 114 has a peripheral groove 115 dimensioned transversely to match the generally circular peripheries of the disks 27. The sheave has a hub 116 of any suitable construction journalled in supports 117 mounted on the table 32. The sheave rim 114 is suspended from the hub 116 by relatively light tension springs 118 acting as spokes, to give the rim a relatively wide freedom for resilient motion relatively to the hub.

From the sheave rim 114 the strand, bearing its spaced disks, passes on to a take-up means adapted to coil it on a spool or reel 119 (Figs. 1, 12, 13 and 14). Because of the disks on the strand, using any of the customary reciprocating guide means to distribute the strand on the reel might disturb the disks on the strand. Hence in this apparatus means are provided whereby the reel may be reciprocated axially of itself and transversely to the strand. To this end the reel support and driving mechanism is mounted on a carriage 120 having rollers or wheels 121 running on a stationary track 122. A rotatable shaft 123 is mounted in the bottom of the carriage parallel to the track and is provided with a reversely threaded portion 124 which engages a nut 125 immovably positioned between the rails. The nut, in place of a female thread, has a wedge ended spring pressed member 126 rotatably mounted in a bore therein, the wedge end being engaged in one of the threads 124 and the member 126 being rotatable to permit the wedge to turn from one thread to the other at their common ends.

Figure 12:
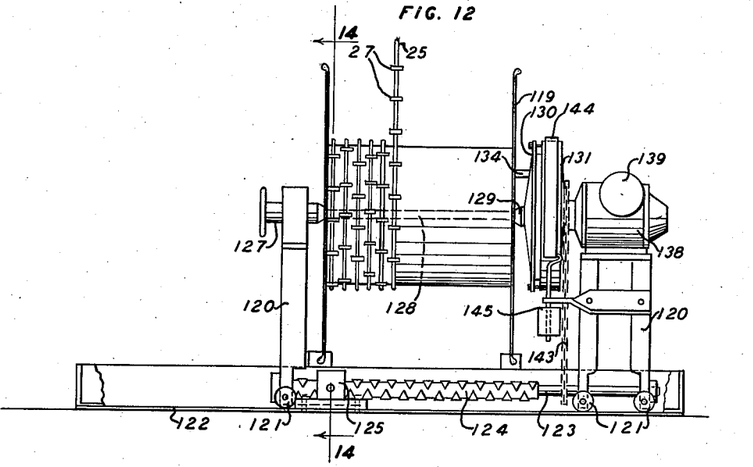
Fig. 12 is a detached view in front elevation of the take-up reel support and drive.
Figure 13:
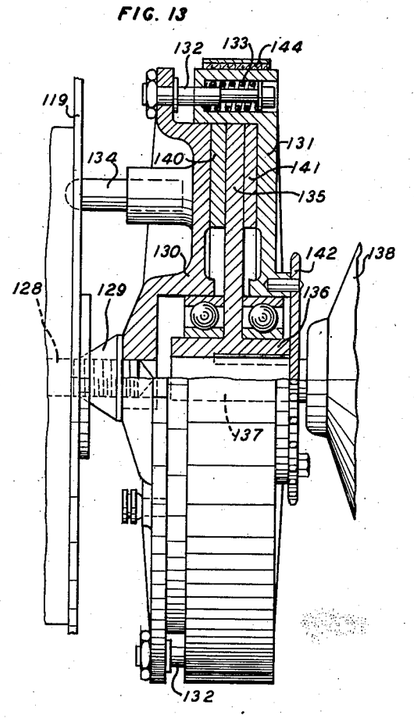
Fig. 13 is an enlarged detached view partly in section of a portion of the take-up reel drive.
Figure 14:
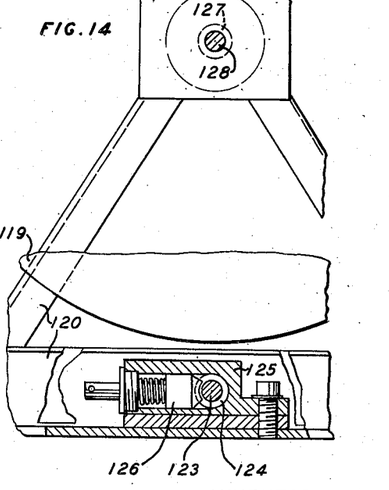
Fig. 14 is an enlarged sectional view on the line 14—14 of Fig. 12.

The reel 119 is supported at one end on a cone wedge 127 journalled in the frame 120, entering the axial bore of the reel, and formed integrally on a shaft 128 passing through the bore. A second cone wedge 129 is threaded on the other end of the shaft 128 to removably and adjustably enter the other end of the reel bore for supporting and gripping the reel. The extreme end of the shaft 128 outside of the cone 129 is supported in a corresponding axial hole in a friction drive disk 130 resiliently secured to a complementary disk 131 by bolts 132 and springs 133. A driving pin 134 rigidly mounted in the disk 130 enters a corresponding hole in the nearest head of the reel to drive the latter. Between the spaced disks 130 and 131 is a driving disk 135 integral with a collar 136 keyed to the power output shaft 137 of a speed reduction gear 138 of any suitable construction driven by a motor 139, both the reduction gear and the motor being mounted on the frame 120. Annular friction members 140 and 141 are interposed between the disk 135 and the disks 130 and 131 respectively. The disks 130 and 131 are rotatably supported on the sleeve or collar 136 on anti-friction bearings. A sprocket 142 journalled on the shaft 137 is pinned to the disk 131 to be driven thereby and, in turn, drives the shaft 123 through a chain 143. A brake band 144 of any suitable material rides on a peripheral rim formed on the disk 131 and has one end attached to the frame 120 by any appropriate means not shown and is tensioned by a removable and interchangeable weight 145.

The apparatus above described for supporting, rotating and traversing the take-up reel 119 forms no part of the present invention, being disclosed and claimed in copending application Serial No. 120,201 filed January 12, 1937 by two of the present inventors. This application has matured to Patent Number 2,141,395 dated December 27, 1938.

Figure 8:
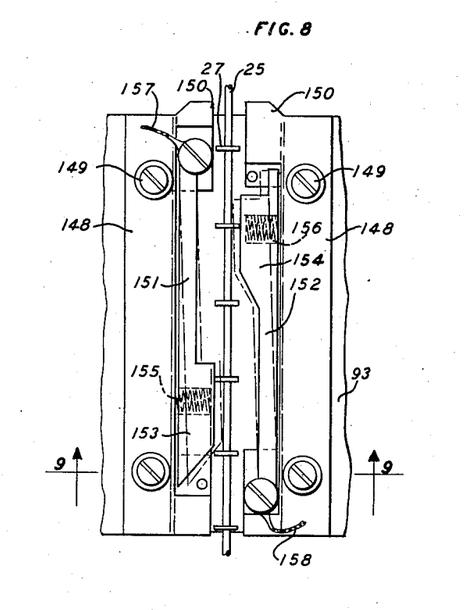
Fig. 8 is an enlarged broken view in front elevation of the automatic missing disk detector.
Figure 9:
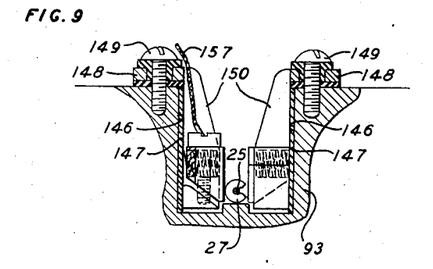
Fig. 9 is a sectional view on the line 9—9 of Fig. 8.

Immediately after passing up between the levers 71 and 72, the strand 25 with the disks 27 thereon is led through an automatic inspecting device which immediately detects and signals the absence of a disk from its proper position on the strand. To provide space for this device (shown in Figs. 3, 4, 8 and 9) the housing 93 of the twin magazines is formed with a vertical recess 146 whose cross-sectional form is best shown in Fig. 9. Lining members 147, 147 are held against the lateral walls of the recess by clamps 148, 148 secured by screws 149. The clamps have integral supporting members 150, 150 extending inwardly over the linings 147, 147. A testing finger, 151 and 152 respectively, is mounted pivotally on each of the supports 150, 150 with freedom to swing toward and from the strand, the finger 151 being pivoted at its upper end and the finger 152 at its lower end. Each finger is formed at the side of its free end toward the strand with an enlarged cam portion, 153 and 154 respectively, and is urged toward the strand by a compression spring 155 or 156. The cam portions 153 and 154 are so formed and proportioned that the successive disks 27 when properly seated and spaced on the strand 25 passing between the fingers, will hold the fingers out of contact with the strand; but if a disk is missing from its proper station on the strand, one or other of the cam portions of the fingers will there make electrical contact with the strand.

Twin terminals 157 and 158 of one side of an electric testing circuit otherwise not shown are connected to the fingers 151 and 152 respectively. A terminal of the other side of the circuit is connected to the strand 25 in any suitable manner not shown. This circuit may be constructed to ring a bell, light a light or otherwise signal the omission of a disk from the strand, and may also be employed to actuate means to interrupt the power supply to the machine generally. Such circuits are well known, and as the details of construction of such apparatus are well known and form no part of the present invention a description thereof is omitted here.

In operation, a strand 25 is threaded through the machine, the magazines are filled with a supply of disks 27 and the machine started by supplying current to the motors 50 and 139. The motor 50, through the chain 49, drives the shaft 38 and therewith the Geneva motion transmission 46, 45; and the output shaft 37 of the Geneva motion drives the reduction gear train 43, 44, 42, 41, which in turn drives the intermeshed twin gears 39 and 40 and therewith the twin strand driving sheaves 35 and 36, thus advancing the strand upwardly from its supply 26 in step by step progression.

At the same time, the shaft 38, through the spiral gears 51, 52 drives the shaft 53 in continuous rotation and thereby the cam 54 which, in coaction with the spring 75 causes the levers 71 and 72 to vibrate alternately to and from the strand 25. At the outer limit of each excursion, the recess 78 of the lever 71 receives the lowermost disk from the column of disks fed down by the corresponding magazine, which it then carries to and seats upon the strand. The lever 85 is displaced from its normal position by the stop 89 to uncover the recess 78 while this is in disk receiving position under the magazine, but is forced back again to cover and help retain the disk in place by the spring 87 as the lever 71 leaves the magazine. The keeper 79 keeps the slot of the disk oriented until just before the disk in the lever 71 reaches the strand when the stop 84 actuates the trigger 82 to draw the keeper out of the way of the strand. The trailing extension 159 of the head of the lever 71 supports the column of disks in the magazine except when the lowermost disk is being fed down into the recess 78.

The parts thus far described in action are so synchronized that at successive pauses in the upward motion of the strand one or other of the levers 71 and 72 in alternation seats a disk on the strand, the successive disks on the strand being thus seated alternately from opposite sides and with their slots oriented 180° apart.

While all this is going on, the shaft 53 is also driving the twin disk aligning members 99 of the magazines in continuous rotation via the gear trains 69, 70, 70. In the form of magazine shown in Fig. 5 the projections 103, the off-center conical surface 101 and the annulus 104 coacts to cause the disks coming down from the hopper 107 to stack themselves in the slanting bore 100. When each disk reaches the bottom end of the bore 100, it rotates with the member 99 until its slot is caught and entered by the fin 98 by which it is properly oriented and guided down to be carried away in its turn by the lever 71 or 72 as the case may be. The functioning in the case of the form of magazine shown in Fig. 16 is so similar that detailed description is thought unnecessary. The principal difference is that gravity is relied on solely in the former to feed the disks, while in the latter compressed air is brought in to help advance the disks down the bore 100.

Meantime the shaft 53 is also driving the train of elements 55, 56, 57, 58, 59, 61, 65, 66, 67 and 68. The shaft 68 is thus driven in reciprocating rotation and whirls the member 160 (Fig. 3) swiftly to and fro to stir up the jumbled mass of disks in the hopper and keep them feeding down into the magazines. In case magazines of the type shown in Fig. 16 are used this may be unnecessary with some sizes of disks, and in such case the stirrer and its entire drive from 55 to 68 inclusive may be omitted.

The strand 25 with disks thereon passes up through the missing disk detector, whose functioning has already been sufficiently described, and comes to the sheave 114 moving step by step, and passes thence to the take-up reel 119 which is driven in continuous rotation. The sheave 114 yields and returns on its resilient spokes enabling the strand coming upon the sheave step by step to leave it and be taken up in smoothly continuous motion.

The take-up reel 119 is driven in continuous rotation by the motor 139 through the reduction gear 138 and the friction clutch 135, 140, 141, 131, 130. This friction clutch is adjusted by means of the bolts 132, to slip in proportion as the diameter of the wound material on the reel increases, thus keeping the linear speed of take-up substantially constant. The reel and its drive are traversed to and fro across the direction of take-up by the sprocket 142, chain 143, shaft 123 and nut 125, to distribute the strand being taken up in even layers on the spool. It will be noticed that the traversing means is driven from the driven member 131 of the clutch, and that therefore the speed of traverse of the spool is always proportional to its speed of rotation.

The embodiment of the invention herein disclosed is illustrative only and may be modified and departed from in many ways without departing from the spirit and scope of the invention as pointed out in and limited solely by the appended claims.

What is claimed is:

1. An apparatus for assembling slotted disks on a strand, comprising means to advance a strand step by step including a pair of coacting sheaves to grip and advance the strand and a Geneva motion to drive the sheaves, means to seat a slotted disk on the strand, means to feed a sequence of disks to the seating means one by one, and means to synchronize the seating means with the advancing means to operate only when the strand in the advancing means is stationary.

2. An apparatus for assembling slotted disks on a strand, comprising means to advance a strand step by step including a pair of coacting sheaves to grip and advance the strand and a pair of intermeshed gears connected to the sheaves and driven by a Geneva motion to drive the sheaves, means to seat a slotted disk on the strand, means to feed a sequence of disks to the seating means one by one, and means to synchronize the seating means with the advancing means to operate only when the strand in the advancing means is stationary.

3. An apparatus for assembling slotted disks on a strand, comprising means to advance a strand step by step, means to seat a slotted disk on the strand including a lever swingable transversely of the strand and having a recess to hold a slotted disk and having a slot corresponding to the slot of the disk to receive the strand, means to feed a sequence of disks to the seating means one by one, and means to synchronize the seating means with the advancing means to operate only when the strand in the advancing means is stationary.

4. An apparatus for assembling slotted disks on a strand, comprising means to advance a strand step by step, means to seat a slotted disk on the strand including a lever swingable transversely of the strand and having a recess to hold a slotted disk and having a slot corresponding to the slot of the disk to receive the strand, a cam to actuate the lever, means to feed a sequence of disks to the seating means one by one, and means to synchronize the seating means with the advancing means to operate only when the strand in the advancing means is stationary.

5. An apparatus for assembling slotted disks on a strand, comprising means to advance a strand step by step including a pair of coacting sheaves to grip and advance the strand and a Geneva motion to drive the sheaves, means to seat a slotted disk on the strand including a lever swingable transversely of the strand and having a recess to hold a slotted disk and having a slot corresponding to the slot of the disk to receive the strand, and a cam to actuate the lever, the Geneva motion and the cam being driven in synchronism to cause the lever to be actuated only when the driven member of the Geneva motion is stationary.

6. An apparatus for assembling slotted disks on a strand, comprising means to advance a strand step by step, means to seat a slotted disk on the strand, means to feed a sequence of disks to the seating means one by one including a housing having a chamber to receive an unoriented plurality of disks and means therein to stack the disks in mutually parallel relation in a column and means to orient each disk in turn with its slot in a predetermined direction and to guide the oriented disk to the seating means while maintaining such orientation, and means to synchronize the seating means with the advancing means to operate only when the strand in the advancing means is stationary.

7. An apparatus for assembling slotted disks on a strand, comprising means to advance a strand step by step, means to seat a slotted disk on the strand, means to feed a sequence of disks to the seating means one by one including a housing having a chamber to receive an unoriented plurality of disks and a rotatable member in the chamber and having the unoriented disks resting thereon and being formed with a slanting bore therethrough dimensioned to form and hold a stacked column of disks and a fixed member mounted at the outlet of the bore and dimensioned to enter the slots of successive disks of the column and guide the same to the seating means each with its slot oriented in a predetermined direction, and means to synchronize the seating means with the advancing means to operate only when the strand in the advancing means is stationary.

8. An apparatus for assembling slotted disks on a strand, comprising means to advance a strand step by step, means to seat a slotted disk on the strand including a lever swingable transversely of the strand and having a recess to hold a slotted disk and having a slot corresponding to the slot of the disk to receive the strand, means to feed a sequence of disks to the seating means one by one including a housing having a chamber to receive an unoriented plurality of disks and means therein to stack the disks in mutually parallel relation in a column and means to guide successive disks from the column to the seating means each with its slot oriented in a predetermined direction, and means to synchronize the seating means with the advancing means to operate only when the strand in the advancing means is stationary.

9. An apparatus for assembling slotted disks on a strand, comprising means to advance a strand step by step, means to seat a slotted disk on the strand including a lever swingable transversely of the strand and having a recess to hold a slotted disk and having a slot corresponding to the slot of the disk to receive the strand, means to feed a sequence of disks to the seating means one by one including a housing having a chamber to receive an unoriented plurality of disks and a rotatable member in the chamber and having the unoriented disks resting thereon and being formed with a slanting bore therethrough dimensioned to hold a stacked column of disks and a fixed member mounted at the outlet of the bore and dimensioned to enter the slots of successive disks of the column and guide the same to the disk holding recess of the seating means each with its slot oriented in a predetermined direction, and means to synchronize the seating means with the advancing means to operate only when the strand in the advancing means is stationary.

10. An apparatus for assembling slotted disks on a strand, comprising means to advance a strand step by step, means to seat a slotted disk on the strand including a lever swingable transversely of the strand and having a recess to hold a slotted disk and having a slot corresponding to the slot of the disk to receive the strand, a cam to actuate the lever, means to feed a sequence of disks to the seating means one by one including a housing having a chamber to receive an unoriented plurality of disks and a rotatable member in the chamber and having the unoriented disks resting thereon and being formed with a slanting bore therethrough dimensioned to hold a stacked column of disks and a fixed member mounted at the outlet of the bore and dimensioned to enter the slots of successive disks of the column and guide the same to the disk holding recess of the seating means each with its slot oriented in a predetermined direction, and means to synchronize the seating means with the advancing means to operate only when the strand in the advancing means is stationary.

11. An apparatus for assembling slotted disks on a strand, comprising means to advance a strand step by step including a pair of coacting sheaves to grip and advance the strand and a Geneva motion to drive the sheaves, means to seat a slotted disk on the strand including a lever swingable transversely of the strand and having a recess to hold a slotted disk and having a slot corresponding to the slot of the disk to receive the strand, a cam to actuate the lever, and means to feed a sequence of disks to the seating means one by one including a housing having a chamber to receive an unoriented plurality of disks and a rotatable member in the chamber and having the unoriented disks resting thereon and being formed with a slanting bore therethrough dimensioned to hold a stacked column of disks and a fixed member mounted at the outlet of the bore and dimensioned to enter the slots of successive disks of the column and guide the same to the disk holding recess of the seating means each with its slot oriented in a predetermined direction, the Geneva motion and the cam being driven in synchronism to cause the lever to be actuated only when the driven member of the Geneva motion is stationary.

12. In an apparatus for assembling slotted disks on a strand, means to seat a disk on a strand, comprising a lever pivoted to swing to and from the strand and having a recess therein to receive a slotted disk and having a slot formed in the disk supporting wall of the recess to coincide in form and location with the slot of a disk seated in the recess.

13. In an apparatus for assembling slotted disks on a strand, means to seat a disk on a strand, comprising a lever pivoted to swing to and from the strand and having a recess therein to receive a slotted disk and having a slot formed in the disk supporting wall of the recess to coincide in form and location with the slot of a disk seated in the recess, in combination with a second lever pivoted to swing with the first lever and substantially in contact therewith, and resilient means to link the two levers together, the parts being so disposed and arranged that the second lever normally covers the disk receiving recess of the first lever and may be yieldingly forced to uncover the recess.

14. In an apparatus for assembling slotted disks on a strand, means to seat a disk on a strand, comprising a lever pivoted to swing to and from the strand and having a recess therein to receive a slotted disk and having a slot formed in the disk supporting wall of the recess to coincide in form and location with the slot of a disk seated in the recess, in combination with means on the lever to enter the slot of a disk in the recess to maintain the orientation of the disk and withdrawable therefrom to permit a strand to enter the slot of the disk.

15. In an apparatus for assembling slotted disks on a strand, means to seat a disk on a strand, comprising a lever pivoted to swing to and from the strand and having a recess therein to receive a slotted disk and having a slot formed in the disk supporting wall of the recess to coincide in form and location with the slot of a disk seated in the recess, in combination with a second lever pivoted to swing with the first lever and substantially in contact therewith, and resilient means to link the two levers together, the parts being so disposed and arranged that the second lever normally covers the disk receiving recess of the first lever and may be yieldingly forced to uncover the recess, the last named means including a bell crank pivoted on the lever and formed on one arm with a nose formed and disposed to pass through the slot in the lever and enter the slot in the disk.

16. In an apparatus for assembling slotted disks on a strand having means to receive and seat a slotted disk on a strand, means to feed disks one by one to the said means, comprising a chamber to receive a plurality of irregularly oriented slotted disks, a rotating member within the chamber and upon which the disks rest, means to stir the disks resting on the member, the member having a bore therein extending from an intake in the top surface thereof eccentric to the axis of rotation of the member to an outlet in the axis in the bottom of the member and the bore being dimensioned to receive and stack the disks in mutually parallel relationship in a column therein with the slots of the disks oriented irregularly by chance, a fixed fin having one end thereof disposed at the outlet of the bore radially thereto and dimensioned to enter the slots of the successive disks of the column to align the same in a common orientation, and means to retain the disks in columnar relation on the fin.

17. In an apparatus for assembling slotted disks on a strand having means to receive and seat a slotted disk on a strand, means to feed disks one by one to the said means, comprising a chamber to receive a plurality of irregularly oriented slotted disks, a rotating member within the chamber and upon which the disks rest, means to stir the disks resting on the member, the member having a bore therein extending from an intake in the top surface thereof eccentric to the axis of rotation of the member to an outlet in the axis in the bottom of the member and the bore being dimensioned to receive and stack the disks in mutually parallel relationship in a column therein with the slots of the disks oriented irregularly by chance, a fixed fin having one end thereof disposed at the outlet of the bore radially thereto and dimensioned to enter the slots of the successive disks of the column to align the same in a common orientation, means to retain the disks in columnar relation on the fin and means to cause the disks to move along the bore and fin.

18. In an apparatus for assembling slotted disks on a strand having means to receive and seat a slotted disk on a strand, means to feed disks one by one to the said means, comprising a chamber to receive a plurality of irregularly oriented slotted disks, a rotating member within the chamber and upon which the disks rest, means to stir the disks resting on the member, the member having a bore therein extending from an intake in the top surface thereof eccentric to the axis of rotation of the member to an outlet in the axis in the bottom of the member and the bore being dimensioned to receive and stack the disks in mutually parallel relationship in a column therein with the slots of the disks oriented irregularly by chance, a fixed fin having one end thereof disposed at the outlet of the bore radially thereto and dimensioned to enter the slots of the successive disks of the column to align the same in a common orientation, means to retain the disks in columnar relation on the fin, and pneumatic means to cause the disks to move along the bore and fin.

19. An apparatus for seating slotted disks on a strand with the slots of alternate disks having unlike orientations radially of the strand, comprising means to advance a strand step by step, means to seat a disk on the strand from one side thereof, means to seat a disk on the strand from another side thereof, means to feed a sequence of disks one by one to each seating means, and means to synchronize the two seating means and the advancing means all with each other so that each seating means will operate only at alternate periods when the strand in the advancing means is stationary and so that operations of each seating means occur alternately with operations of the other.

20. An apparatus for seating slotted disks on a strand with the slots of alternate disks having unlike orientations radially of the strand, comprising means to advance a strand step by step including a pair of coacting sheaves to grip and advance the strand and a Geneva motion to drive the sheaves, means to seat a disk on the strand from one side thereof including a lever swingable transversely of the strand and having a recess to hold a slotted disk and having a slot corresponding to the slot of the disk to receive the strand, means to seat a disk on the strand from another side thereof including a lever swingable transversely of the strand and having a recess to hold a slotted disk and having a slot corresponding to the slot of the disk to receive the strand, a cam to actuate the levers in turn, and means to feed a sequence of disks one by one to each seating means, the Geneva motion and the cam being driven in synchronism to cause the levers to be actuated one at a time in turn and one only at each period when the driven member of the Geneva motion is stationary.

21. An apparatus for assembling slotted disks on a strand, comprising means to advance a strand step by step, means to seat a slotted disk on the strand, means to feed a sequence of disks to the seating means one by one including a housing having a chamber to receive an unoriented plurality of disks and means therein to stack the disks in mutually parallel relation in a column and to rotate the column about an axis passing through the foot of the column, means to orient each disk in turn with its slot in a predetermined direction and to guide the oriented disk to the seating means while maintaining such orientation, and means to synchronize the seating means with the advancing means to operate only when the strand in the advancing means is stationary.

22. An apparatus for assembling slotted disks on a strand, comprising means to advance a strand step by step, means to seat a slotted disk on the strand, means to feed a sequence of disks to the seating means one by one including a housing having a chamber to receive an unoriented plurality of disks and a rotatable member in the chamber and having the unoriented disks resting thereon and being formed with a slanting bore therethrough dimensioned to form and hold a stacked column of disks and to rotate the column about an axis passing through the foot of the column, a fixed member mounted at the outlet of the bore and dimensioned to enter the slots of successive disks of the column and guide the same to the seating means each with its slot oriented in a predetermined direction, and means to synchronize the seating means with the advancing means to operate only when the strand in the advancing means is stationary.

FRED V. JOHNSON.
DUER C. ROBSON.
GEORGE A. SEELEY.